Sept. 11, 1956  R. GOTTSCHALK  2,762,256
MOVING PICTURE VIEWER

Filed Sept. 29, 1950

INVENTOR.
ROBERT GOTTSCHALK
BY
ATTORNEY

Sept. 11, 1956 R. GOTTSCHALK 2,762,256
MOVING PICTURE VIEWER
Filed Sept. 29, 1950 5 Sheets-Sheet 2

INVENTOR.
ROBERT GOTTSCHALK
BY
ATTORNEY.

Sept. 11, 1956  R. GOTTSCHALK  2,762,256
MOVING PICTURE VIEWER
Filed Sept. 29, 1950  5 Sheets-Sheet 3

INVENTOR.
ROBERT GOTTSCHALK
BY
ATTORNEY

Sept. 11, 1956  R. GOTTSCHALK  2,762,256
MOVING PICTURE VIEWER
Filed Sept. 29, 1950  5 Sheets-Sheet 5

INVENTOR.
ROBERT GOTTSCHALK
BY
ATTORNEY

United States Patent Office 2,762,256
Patented Sept. 11, 1956

2,762,256

MOVING PICTURE VIEWER

Robert Gottschalk, Wichita, Kans.

Application September 29, 1950, Serial No. 187,424

12 Claims. (Cl. 88—18.4)

The invention herein disclosed relates to apparatus for viewing motion pictures and general objects of the invention are to provide self-contained apparatus, complete in one unit, including a viewing screen suitable for one or a number of persons, compact in design, conveniently small and portable in character, making it practical for carrying about and using on a table top, desk or the like.

An important object of the invention is to facilitate the placing of the film in the machine and to enable this to be accomplished by simply inserting the end of the film in a simple form of guide and without having to thread it around sprockets, loop forming devices and the like, as required in ordinary motion picture projecting equipment.

A further important and more specific object of the invention is to provide simple, effective loop forming mechanism which will operate automatically and only to the extent required by the intermittent film advancing mechanism.

Another important object of the invention is to provide automatic rewinding of the film and the maintaining of the displayed film in the same relation as first placed in the machine, in shape to be immediately re-run without rewinding.

Other special objects of the invention are to provide a viewer which can be readily controlled as desired to show a continuous moving picture or stopped and started to show selected frames as "stills."

Further objects of the invention are to enable control as to speed of projection and rewind and to facilitate focusing, framing and such adjustments.

Other desirable objects and the novel features through which the purposes of the invention are attained are set forth or will appear in the course of the following specification.

The drawings accompanying and forming part of the specification illustrate certain present preferred commercial embodiments of the invention. Structure, however, may be modified and changed as regards the immediate disclosure, all within the true intent and broad scope of the invention as hereinafter defined and claimed.

Figure 1:
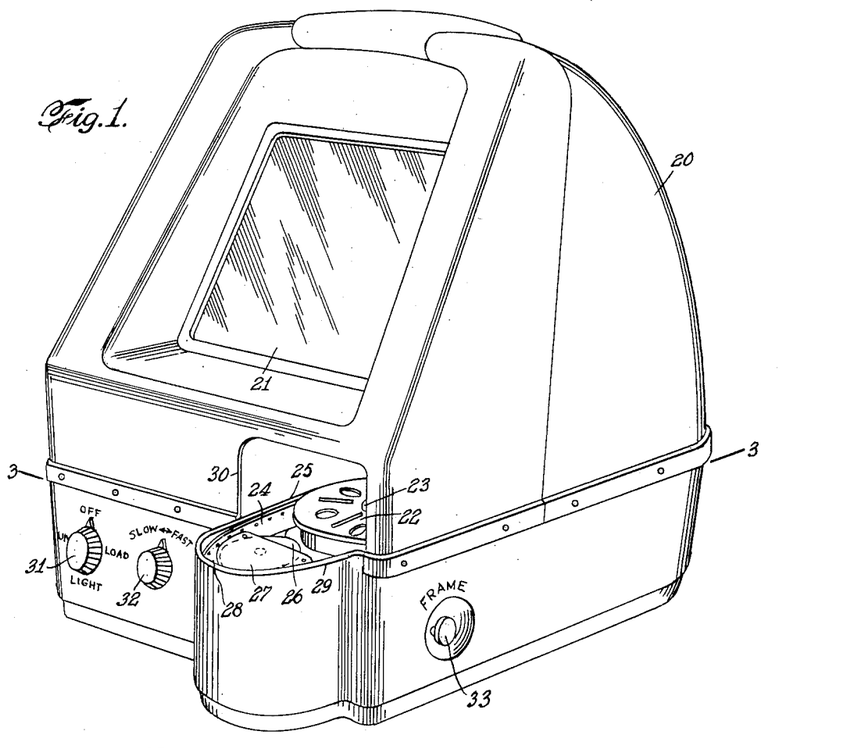
Figure 1 in the drawings is a front perspective view of one of the machines.

The machine, as shown in Figure 1, comprises a casing 20 small enough in size to be placed on a table or other support, having a viewing screen 21 of ample picture size in the front upper portion of the same and containing an optical system and motor driven intermittent film advancing and rewind mechanism and automatic and manual controls for effecting desired results.

Figure 1 illustrates also certain of the more important factors of the invention, the placing of the film in the machine by simply locating the reel 22 carrying the film over the end of an upright shaft 23 exposed at the front of the machine and slipping the end of the film 24 into the horizontal guide 25 and in so doing, dropping a free loop of the film about the looper fly-wheel 26.

To assist in the formation of this free loop of film and the placing of the same about the looper 26, there is provided in the illustration an arcuate guide 27 over the outward portion of the looper and shaped to afford a loop receiving open slot at 28 between the downwardly rounded arcuate edge of this guide and the surrounding upright arcuate loop confining stationary wall portion 29 of the casing. The front of the case is shown as having a hand hole opening 30 in the lower portion of the same above the loop directing guide 27 and loop confining rim 28 of a size and shape to freely admit the reel and allow for easy placing of the film, and if desired, a door may be provided for closing this opening when the machine is running.

Some of the controls governing operation of the machine appear in Figure 1; at the front, the knob 31 for starting and stopping, having the four positions "Off," "Load," "Light" and "Run," next to that the speed control knob 32 and at the side the framing knob 33.

Figure 2:
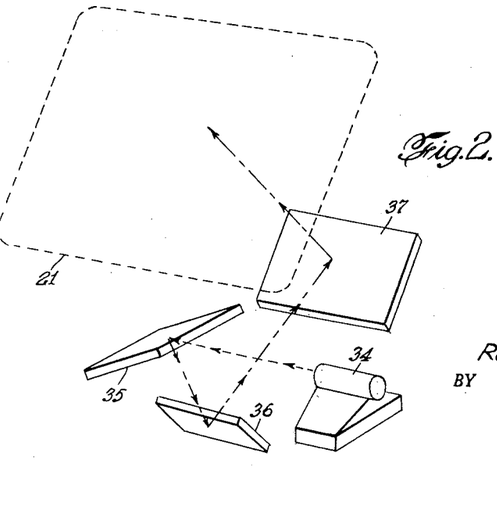
Figure 2 is a diagram illustrating the self-contained optical display system.

Figure 2 illustrates diagrammatically the simple optical system employed in the machine and embodying a condensing and projecting lens system 34 focused on a first, downwardly directed reflector 35 which faces a second upwardly directed reflector 36 lined up with a final reflector 37 directed on the back of the light transmitting screen 21.

Figure 3:
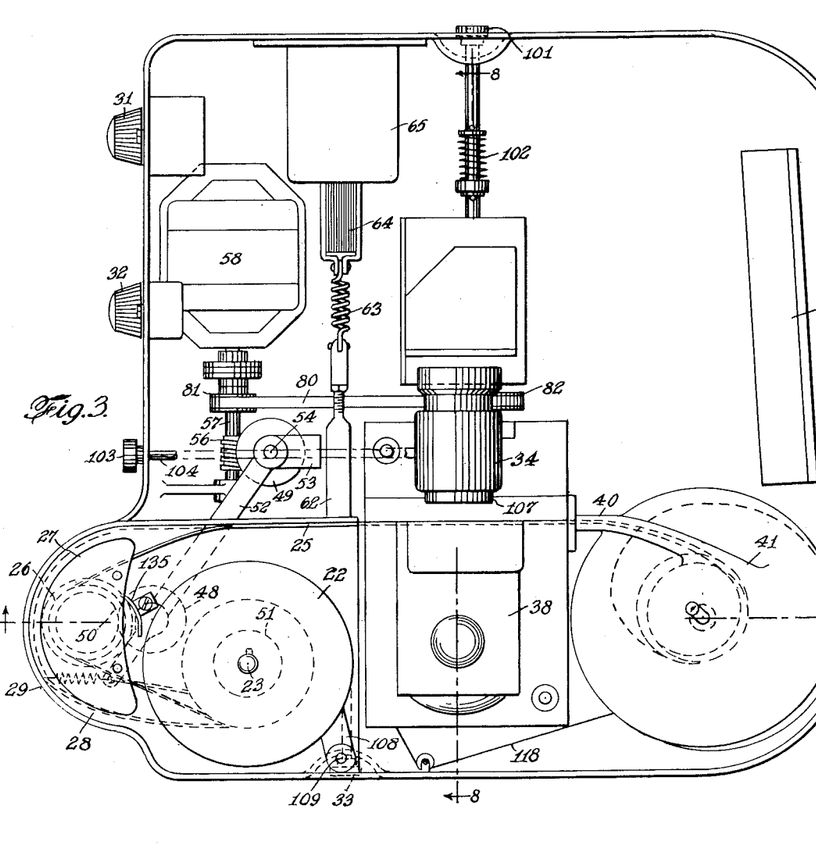
Figure 3 is a horizontal sectional view as on substantially the plane of line 3—3 of Figure 1, showing in plan the travel of film from the reel, about the looper and through the intermittent feed mechanism into the free running take-up holder.

Figure 3 illustrates the complete travel of the film from the supply reel 22, about the looper 26 through the guide 25 and past the lantern 38 and intermittent advancing mechanism into the receiver 39.

Figure 6:
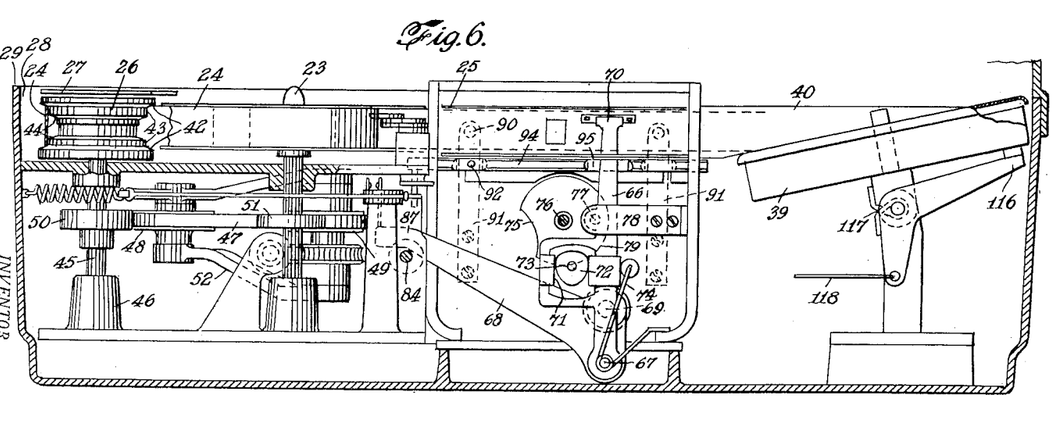
Figure 6 is an enlarged broken vertical sectional view as on substantially the plane of line 6—6 of Figure 3, showing at the left a loop of film as frictionally gripped in the convergent wedge track of the looper fly-wheel.

The latter is shown in Figures 3 and 6 as a free running shallow pan, journaled below and inclined toward the overstanding film guide 40 at the exit side of the projector in position to receive the lead end of the film issuing from this guide.

The guide 40 is stationary and is used in this instance as a bracket supporting the stationary cover 41 over and clear of the rotating film receiver 39.

The looper 26, as shown in Figure 6, is of special design in that it has opposed taper faced flanges 42 spaced to receive and to wedgingly grip the film 24 therebetween.

The incline and lateral extent of these flanges is such as to freely receive but to quickly grip the edges of the film. A convergent angle of approximately 16 degrees has been found practical and desirable for the purpose. With this wheel turning continuously, at greater than film feed speed, the loop of film as it contracts into engagement with the convergent flanges, as indicated in full lines Figure 3, will be practically immediately caught and snapped outward into a full size loop withdrawn from the reel, as shown in broken lines in this same view.

Annular shoulders 43 at the base of the convergent film gripping flanges 42 afford edge support for the film as it is gripped between the flanges and afford a limit for the wedging gripping engagement of the film.

In order that the same looper may be used for 8 mm. as well as for 16 mm. film, the same is shown constructed with an inner pair of convergent film gripping flanges 44 spaced to receive and grip the smaller width film.

In addition to affording the possibility of interchangeable use on either 8 mm. or 16 mm. film machines, this provision of the inner set of more closely spaced wedge flanges is an advantage in lightening the weight of the wheel, the gripping flanges being sufficient in themselves to afford the desired fly-wheel effect.

The shaft 45 of the looper 26 is shown in Figure 6 stepped in a bearing 46 spaced from the upright reel supporting shaft 23 and these two shafts are alternately driven for projecting and rewinding purposes by a friction belt 47 running over pulleys 48 and 49 and mounted to be carried into driving engagement with friction wheels 50 or 51 on the looper and reel shafts respectively.

To enable these clutching and unclutching movements the belt carrying pulleys 48, 49 are journaled in a frame 52 shown pivoted to swing in a bracket 53 on the axis of the shaft 54 carrying pulley 49, the other belt carrying pulley 48 being journaled in the free end of this swinging bracket in position for the belt 47 running thereover to frictionally engage either of the friction pulleys 50 or 51 on the looper and reel shafts.

Figures 7, 8, 9, 10:
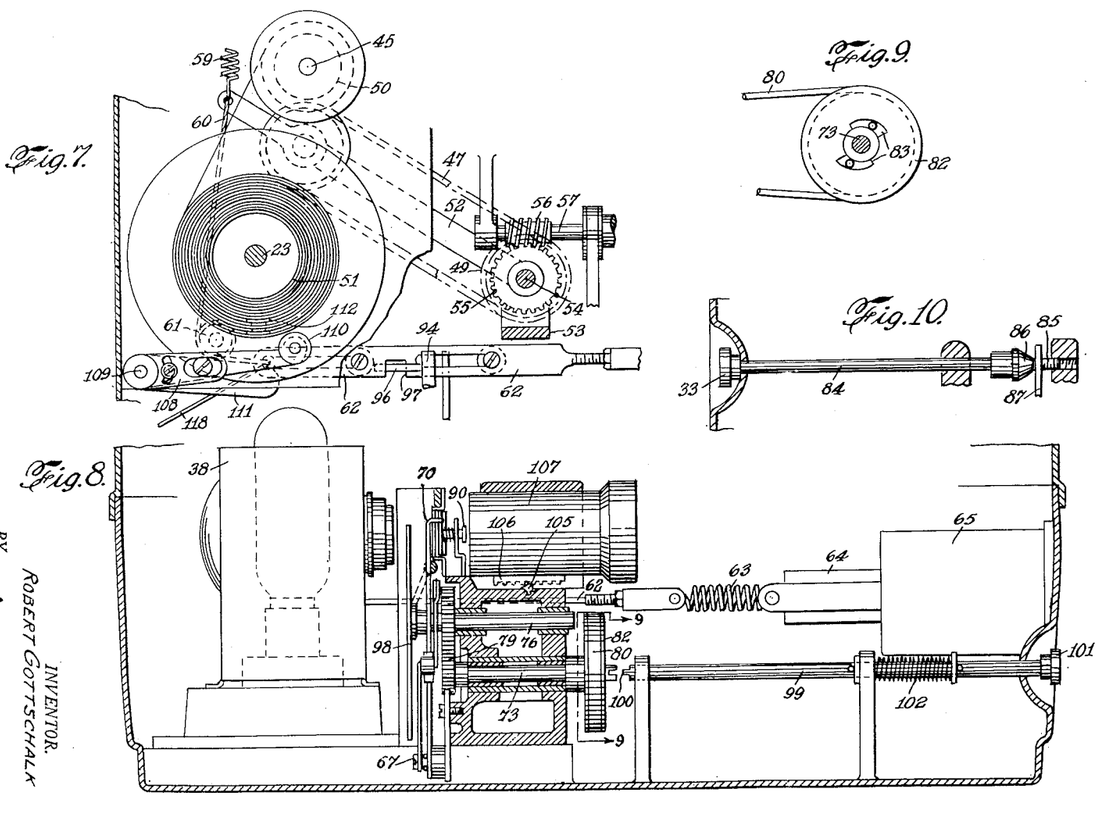
Figure 7 is a broken and part sectional horizontal plan view showing in particular the frame carrying the drive belt which can be swung into frictional driving relation with the looper shaft at one side or with the reel shaft at the opposite side, together with the solenoid actuated slide governing such movements and the follower riding on the film for closing the solenoid circuit at or near the end of the projection period.
Figure 8 is a broken vertical sectional view across the projector mechanism on substantially the plane of line 8—8 of Figure 3, with the solenoid de-energized and the slide in the normal running position and the feed claw free as in Figure 4 to engage and advance the film.
Figure 9 is a broken part sectional detail as on the plane of line 9—9 of Figure 8, illustrating the one-way clutch for driving the intermittent feed cam shaft in the film advancing direction and permitting it to remain at rest in the reverse, rewinding operation of the film.
Figure 10 is a broken sectional detail of the control shaft for effecting framing adjustments.

Drive of the pulley 49 at the inner pivotal end of the swinging frame 51 is effected in the illustration by the provision of a spiral gear 55 on the shaft 54 carrying this pulley, Figures 3 and 7, engaged by a corresponding gear 56 on the shaft 57 of the motor 58.

Swinging movement of the pulley and belt carrying arm or frame 52 is effected in the illustration by a spring 59, Figure 7, connected to pull the arm over to hold the belt 47 in engagement with friction pulley 50 on the looper shaft 45 and by a cord 60 connected to pull the arm over in the opposite direction to effect engagement of the belt with the friction pulley 51 on the reel shaft 23.

The pull cord 60 is shown in Figure 7 as extended about a guide pulley 61 to the slide 62, resiliently connected through spring 63 with the core 64 of the solenoid 65.

During viewing operations the solenoid remains deenergized with the spring 59 holding the drive belt coupled to the looper, as indicated in Figure 7. In the rewinding stage the solenoid is energized, with the slide 62 pulling on the cord 60 to hold the drive belt in operating engagement with the friction pulley on the reel shaft 23.

The intermittent film advancing means comprises in the present illustration, an upright spring lever 66, Figure 6, pivotally supported at its lower end at 67 on the lower arm of a bellcrank 68 pivoted at 69 and carrying at its upper end a fork 70 for engagement with the film passing through the guide 25.

The claw lever 66 carries a yoke 71 engaged about a cam 72 on shaft 73 and held in engagement with said cam by spring 74 looped about the lever pivot 67.

Cam 72 is thus caused to effect the lateral movement of the claw lever and the in and out movement of said lever necessary to effect engagement with and disengagement from the film is attained in the present disclosure by a face cam 75 on shaft 76 engaged by a thrust point 77 on the lever. A flat spring 78 holds the lever normally engaged with the face cam 75.

Two-to-one gearing 79 is shown provided between the lower and upper cam shafts 73, 76.

The lower cam shaft 73 is shown as driven by belt 80 and pulleys 81 and 82 from the motor shaft 57.

A special feature of pulley 82 on the lower cam shaft is that it has incorporated in it a one-way drive clutch, such as the roller cam type clutch illustrated at 83 in Figure 9, so as to turn cam shaft 73 only with the motor running in the forward drive picture exhibiting direction and to allow said shaft to remain at rest when the motor is running in the reverse film rewinding direction.

Adjustment of bellcrank lever 68 to accomplish framing of the pictures on the screen is effected in the illustration by a shaft 84 turned by the knob 33, Figures 1 and 10, and having a screw engagement at 85 in a stationary portion of the machine, said shaft carrying a cone shaped cam 86 for lifting or permitting lowering movement of the projecting arm portion 87 of the bellcrank lever 68. As this shaft is turned to screw inward in the frame the cone cam will lift the arm 87 and thus rock the pivotal center 67 of the claw lever to the left in Figure 6, and turned in the opposite direction, this cam will lower the bellcrank to shift the pivotal center 67 to the right, thus in one case advancing and in the other case retarding the film shifting action of the claw lever.

Figure 4:
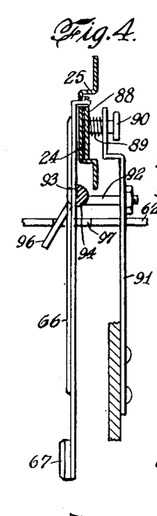
Figures 4 and 5 are enlarged broken sectional details taken across the film guide and illustrating particularly the cam rock shaft for lifting the claw out of engagement with the film and relieving the pressure plate from holding engagement with the film.
Figure 5:
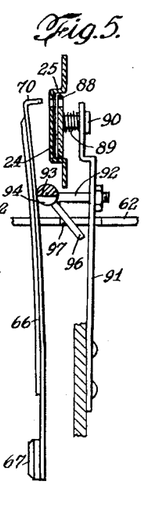

The film is controlled in its movement through the guide or gate 25 by a presser plate 88 shown in Figures 4 and 5 as thrust toward the film by springs 89 on headed studs 90 extending freely through the upstanding supporting springs 91.

The position of these upstanding spring supports 91 is governed by fixed studs 92 projecting therefrom into engagement with cam flats 93 on a rock shaft 94.

This rock shaft 94, as particularly shown in Figure 6, also has a cam flat 95 in alinement with the oscillating claw lever.

As will be clear from the foregoing, a part turning movement of cam shaft 94 from the Figure 4 to the Figure 5 position, will effect both the lifting of the claw away from engagement with the film and a release of the pressure plate from clamping engagement with the film.

Operation of the dual purpose cam shaft 94 is effected in the illustration by the provision of a rock lever 96 projecting from this shaft into a notch 97 in the solenoid actuated slide 62.

These parts are so arranged that with each energization of the solenoid the slide 62 will rock the cam shaft 94, Figure 4, to release both the feed claw and the pressure plate and to hold them in the released relation shown in Figure 5.

The upper, half-time cam shaft 76 is shown as carrying a bladed shutter 98 rotating across the optical axis.

When the machine is stopped to view a single picture, the shutter may stand in an obscuring position so provision is made for manually shifting the shutter one way or the other to remove this obscuration.

The means for such purpose comprises in the illustration a shaft 99, Figures 3 and 8, having a clutch engagement at 100 with the end of the lower cam shaft 73 and provided with an exposed operating knob 101 at the outer end, a spring 102 exerting end thrust on this shaft to normally hold it in the clutch disengaged position.

If the machine should stop with the shutter in an obscuring position, the knob 101 may be pushed in to engage clutch 100 and then turned one way or the other to rotate shaft 73 and through gearing 79 the shaft 76 carrying the shutter 98.

The focusing adjustment is shown in Figure 3 as a knob 103 at the front of the machine on a shaft 104 carrying a pinion 105, Figure 8, in mesh with a rack 106 on the slidably mounted lens tube 107.

Automatic rewind is effected in the present disclosure by reversing the motor 58, clutching the friction drive belt 48 into driving engagement with the clutch pulley 51 on the reel shaft 23 and releasing and claw the pressure plate so as to permit the film to wind back freely on the reel. During such time the looper 26 being free of any drive will simply turn as an idler guiding the film back onto the reel.

For accomplishing all this a reversible motor is employed and a feeler is provided for ascertaining the near of the end run-off of the film and for then reversing the motor and energizing the solenoid.

This feeler is shown in Figure 7 as a lever 108 pivoted at 109 off to one side of the reel and carrying at its free end a roller 110 riding the film on the reel and carrying below the reel an arm 111 to close the spring switch contacts 112. The roller carrying arm 108 and switch closing arm 111 are shown as connected at 113 in angularly adjustable relation so that the closing of switch 112 can be effected at points with more or less film left on the reel.

Figure 11:
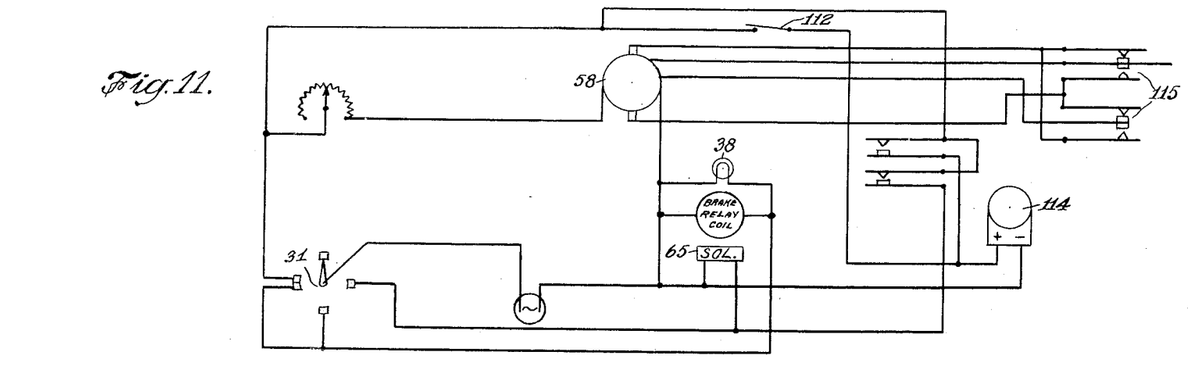
Figure 11 is a wiring diagram of the machine.

The wiring diagram, Figure 11, shows how with closing of switch 112 a relay 114 will be energized to close reversing contacts at 115 through the motor and to energize solenoid 65, when the main control switch 31 is in the number three, running position.

The wiring diagram further shows how in the number one or loading position, the solenoid only will be energized to effect release of the claw and pressure plate from the film and thus leave the film guide open to freely receive the starting end of the film.

In the number two or "Light" position of control switch 31, only the lamp 38 will be energized and this because of the close compact arrangement and short optical path may be of relatively low wattage so that no injury will result from viewing the single frame or frames for still pictures.

In the number three, running position of control switch 31, both the motor 58 and the lamp 38 will be energized, the motor in the forward drive direction, these continuing so long as the switch is in this position and until the reel switch 112 is closed by the feeler 110 on nearing the end of the film.

To prevent the passive film receiver 39 from overrunning and tangling the film coiling inwardly within the same, a slight braking force may be applied thereto during the projecting cycle and be automatically released during rewinding.

Structure for accomplishing these results is shown in Figure 6 in the form of a brake lever 116 tensioned by spring 117 to engage the bottom of the pan and linked by cord 118 to slide 62 so as to be released when the solenoid is energized in the rewinding part of the cycle.

OPERATION

Loading

To load the machine the control switch is turned to the number one or loading position. This, as previously described, energizes solenoid 65 to pull the slide 62 which turns the cam shaft 94 from the Figure 4 to the Figure 5 position to retract the claw 70 and take pressure off the pressure plate 88.

The end of the film may then be entered without obstruction into the stationary guide 25 and this may be done before or after the reel is placed on the spindle 23.

In either event, a free loop of the film extending from the reel to the stationary guide is dropped down through the slot 28 between the arcuate guide 27 and surrounding rim 29 to locate the loop about the looper fly-wheel 26.

Running

The control knob 31 may then be turned back through the off position or forward through the light position to the "Run" position. In either event, the solenoid will be de-energized and the motor and light turned on, the motor in the forward running direction.

When the solenoid is de-energized the spring 59 pulls the frame 52 over to the right in Figure 7, thus to couple the drive belt 47 in frictional driving engagement with the clutch pulley 50 on the looper shaft 45.

When the solenoid is thus de-energized the slide 62 under pull of the spring 59 will turn the rock shaft 94 from the Figure 5 back to the Figure 4 position to drop the claw and pressure plate back into cooperative relation with the film.

With the motor running forwardly, the looper will be driven continuously in the direction to pull film from the reel and advance it into the guide intermittently each time the loop of film contracts sufficiently to wedge into gripped engagement with the convergent flanges 42 of the looper. This occurs each time the oscillating claw takes film away from the looper sufficiently to reduce the loop more or less approximately to the arc of the looper, about as indicated by the full lines in Figures 3. The higher speed of rotation of the looper causes it to snap the film away from the reel and to feed it away from the reel and to advance it in a wider loop, as indicated in the broken lines, into the film guide, and this is effected so instantaneously as to practically relieve the claw of any drag. Thus the claw is free to effect the intermittent film advancing movements quietly and smoothly.

At any time during the projection the controller 31 may be turned to the "Off" position to stop the machine, or to the "Light" position for viewing a single frame as a still picture.

In the latter position, only the lamp will be energized.

In this or in the running position the picture may be framed by adjusting knob 33 or focused by adjusting knob 103.

Re-winding

As the end of the film is approached, the feeler 110, Figure 7, closes switch 112 to energize the reversing relay 114.

This accomplishes energizing of solenoid 65 to pull the slide 62 through the cord connection 60, swing the frame 52 to the left in Figure 7 to uncouple the frictional drive belt 47 from the looper clutch pulley 50 and to carry it over into driving engagement with the clutch pulley 51 on the reel spindle 23.

The motor then running in reverse direction drives the reel spindle in the film rewinding direction.

The solenoid being energized during this rewinding stage, through the slide 62, holds the claw and pressure plate released, as in Figure 5, so that the film is free to rewind on the reel.

Also during this rewinding the brake 116, Figure 6, which holds the free turning film receiving pan 39 sufficiently to cause the entering film to coil smoothly against the rim of the pan is released by pull of the cord 118 attached to the slide so that there is no drag on the film in this reverse unwinding movement of the receiver.

At the end of the rewinding operation the machine may be stopped by turning the control at 31 to the "Off" position or means may be provided for automatically stopping the machine at the completion of the rewinding operation.

During projection the film is pushed into the revolving tray or pan by the joint feeding action of the oscillating intermittently acting claw and the continuously rotating but intermittently acting looper, against the rim of the tray and with the film coiling inwardly toward the center. Consequently, the film is coiled in the same way it was on the supply reel, with the leading end at the outside of the coil and so actually is in condition to be immediately run through the machine again, without rewinding. The rewinding really is only necessary to put the film back on the reel. Accordingly, it is within the contemplation of the invention that the coil wound in the receiver may be placed back on a support at the reel station and run through the machine in that condition. Such a support might be a turntable with a core to fit the open center of the coil, leaving the leading end of the film free to be inserted through the film guide into engagement with the claw.

A stationary or rotating core may be provided in the receiver tray 39 to aid in directing the incoming film outwardly against the rim of the tray.

It is considered also that one or more of the wedge grip loopers may be interposed at the exit end of the projector to assist in pushing the film into the tray. Such a looper or loopers may be located to engage the outer side of the film loop, rotating in the direction of film travel so as to assist the feed of film each time the loop expands outwardly into engagement with the same.

It is contemplated also that instead of locating the supply and receiver holders for the film at the front and side portion of the machine, these may be located at the back or some other portion of the machine.

Various other changes come with the scope of the invention as described and claimed.

The claw construction disclosed is quiet, quick and accurate in action. The two-to-one gearing between the lower, cam shaft 73 and the upper cam and shutter shaft 76 provides for an idle stroke of the claw lever between successive feed strokes, the face cam 75 being designed accordingly to allow the claw to engage the film on one forward stroke and to hold it out of engagement with the film on the succeeding back stroke and the next forward and back strokes.

The compact arrangement of parts enables embodiment of the machine in a small size convenient for handling and placing on a table or other support. The control operations and adjustments are simple and readily formed. Of particular importance is the ease with which the machine may be loaded, by simply dropping the coil of film into position with the leading end entered in the film guide and disposed about the looper fly-wheel. These simple acts are accomplished without having to open up or disturb any parts of the machine. All operating mechanism may be enclosed, leaving the viewing screen as the prominent and main observable portion of the machine. This transparent screen may be framed in an inset portion of the upper front wall of the machine casing, inclined for most convenient viewing. The back wall portion of the case, as shown in Figure 1, may be rounded or inclined upwardly to meet the inclined front wall portion, thus to provide a more or less symmetrical and attractive appearing casing.

Figure 12:
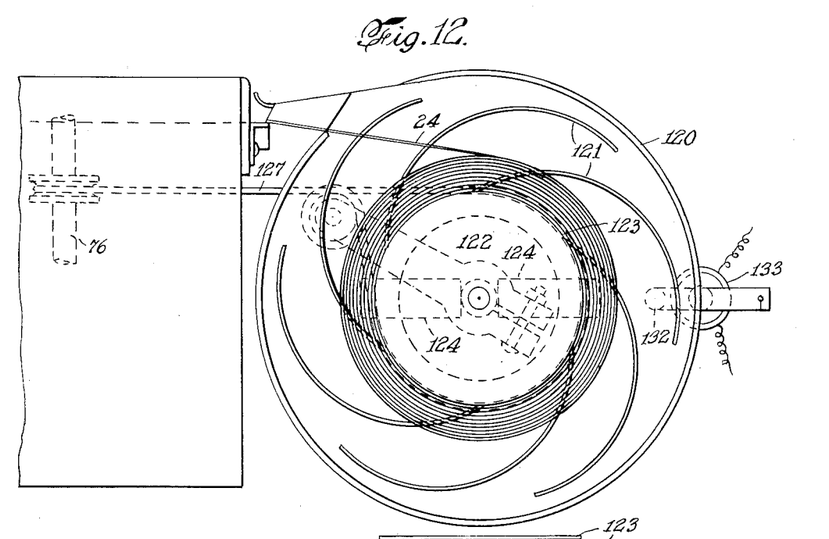
Figure 12 is a broken top plan view illustrating a form of the machine in which the film is automatically wound in the film receiver by a film gripping spool similar to the looper and driven through a magnetic form of clutch.
Figure 13:
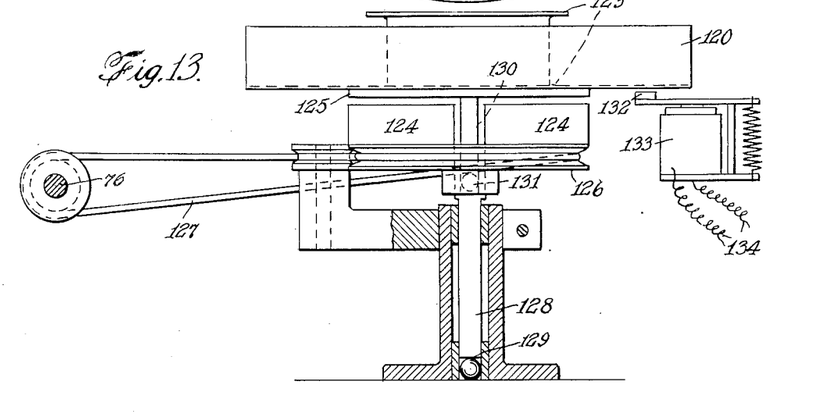
Figure 13 is a broken and part vertical sectional view of the same.

The form of the invention shown in Figures 12 and 13 may be preferred for general purposes because in this construction the film entering the receiver is directed to the center and taken under control by a tapered film gripping spool similar in construction to the free loop forming spool.

Specifically, as shown in Figure 12, the rotary pan or dish 120 which receives the film has a series of ribs or ridges 121 on the bottom of it curved spirally inwardly toward the center, direction of rotation considered, so as by edge engagement to direct entering film toward the center, and at the center there is provided a spool 122 having inwardly convergent flanges 123 to frictionally grip and wind the film thereon.

This receiver is driven to accomplish these results through a magnetic slip clutch shown as consisting of a pair of bar magnets 124 opposed to an armature 125 on the bottom of the receiver and carried by a pulley 126 driven by belt 127 from the shutter shaft 76.

The upright shaft 128 carrying the pulley and permanent bar magnets is shown as stepped in a ball thrust bearing 129 and the shaft 130 carrying the receiver is shown stepped in a similar antifriction thrust bearing 131 in the upper end of the pulley shaft.

The armature 125 on the bottom of the film receiver is spaced by a short air gap from the bar magnets 124 to cause the pan to rotate with a slip drive effect so as not to impose objectionable pull on the film and so as to take away film advanced by the claw and looper at a proper rate of speed.

This construction has the same advantages as the first form of the invention disclosed in that it is not necessary to specially thread the film, it only being required that the film be inserted in the guide within reach of the claw so that with turning on the machine the claw and looper will advance film into the receiver. The receiver then, rotated by the magnetic clutch, will direct the entering end of the film inwardly into the grip of the receiving spool 122 which thereupon will operate to coil the film from the center outward.

This necessitates rewinding of the film and this may be accomplished as first described, automatically through reversal of the motor and the driving of the supply film spool in the rewinding direction.

During such rewinding the pulley carrying the bar magnets remains at rest due to the non-driving of the shutter shaft through one-way clutch 83, placing a desirable magnetic drag on the reverse operation of the receiver.

While this slight magnetic braking may be sufficient, it is preferred to provide a friction brake which will come on automatically and be released when the machine is projecting or showing the film.

This automatic brake is shown in Figures 12 and 13 as a brake shoe 132 positioned to engage the bottom of the pan and arranged to be released by an electromagnet 133 which may be connected by wiring 134 with the circuit for the light, so that whenever the light is on and the dish needs to turn free this brake will be off.

To overcome any tendency of the film to bind in the tapered channel formed between the convergent flanges, a guard may be provided such as shown at 135, Fig. 3, projecting in between the flanges at the run-off side of the spool so as to strip the film from the spool against any tendency of it being carried around the spool further than it should be. This guard may project inwardly of the spool below the shoulders 43, Fig. 6, so as to surely strip off any film even though it be worn and undersize.

What is claimed is:

1. Motor driven film advancing mechanism including a film guide, an oscillating claw mounted for cooperation with the film passing through said guide, film supports at opposite ends of said film guide and a continuously operating fly-wheel interposed between the entering end of the film guide and the film support at that end of the film guide and having opposed convergently inclined flanges relatively spaced and positioned to wedgingly grip a loop of the film passing from said film support into the film guide said fly-wheel rotating at higher speed than the normal rate of travel of the film whereby to withdraw the film from said film support and to advance it into the film guide when the film engages said fly-wheel on reduction of the size of the loop between the film support and entering end of the film guide.

2. Motor driven film advancing mechanism including a film guide, an oscillating claw mounted for cooperation with the film passing through said guide, film supports at opposite ends of said film guide, a continuously operating fly-wheel interposed between the entering end of the film guide and the film support at that end of the film guide and having opposed convergently inclined flanges relatively spaced and positioned to wedgingly grip a loop of the film passing from said film support into the film guide, said fly-wheel rotating at higher speed than the normal rate of travel of the film whereby to withdraw the film from said film support and to advance it into the film guide when the film engages said fly-wheel on reduction of the size of the loop between the film support and entering end of the film guide, a stationary loop restricting confining wall about said fly-wheel and a guard over said fly-wheel and spaced inwardly from said loop restricting confining wall to provide a slot for entry of a loop of film about the fly-wheel.

3. Motor driven film advancing mechanism including a generally horizontal film guide, an oscillating claw mounted for cooperation with the film passing through said guide, film supports at opposite ends of said film guide and a continuously operating fly-wheel interposed between the entering end of the film guide and the film support at that end of the film guide and having opposed convergently inclined flanges relatively spaced and positioned to wedgingly grip a loop of the film passing from said film support into the film guide, said fly-wheel rotating at higher speed than the normal rate of travel of the film whereby to withdraw the film from said film support and to advance it into the film guide when the film engages said fly-wheel on reduction of the size of the loop between the film support and entering end of the film guide, the support at the exit end of the film guide being a generally horizontal pan mounted for free rotation and having a rim portion engageable by the leading end of the film so as to be propelled by the film passed through the film guide by said oscillating claw and film gripping fly-wheel.

4. Motor driven film advancing mechanism including a film guide, an oscillating claw mounted for cooperation with the film passing through said guide, film supports at opposite ends of said film guide and a continuously operating fly-wheel interposed between the entering end of the film guide and the film support at that end of the film guide and having opposed convergently inclined flanges relatively spaced and positioned to wedgingly grip a loop of the film passing from said film support into the film guide, said fly-wheel rotating at higher speed than the normal rate of travel of the film whereby to withdraw the film from said film support and to advance it into the film guide when the film engages said fly-wheel on reduction of the size of the loop between the film support and entering end of the film guide, the support at the exit end of the film guide being a pan mounted for free rotation and having a rim portion engageable by the leading end of the film so as to be propelled by the film passed through the film guide by said oscillating claw and film gripping fly-wheel and a cover and film directing guide over the top of said freely rotating pan for coiling the film entering the pan against the rim and inwardly toward the center of the pan.

5. Apparatus of the character disclosed comprising a film guide, a pressure plate for cooperation with the film passing through said guide, a feed claw cooperable with the film controlled by said pressure plate, film supports adjacent opposite ends of the film guide, a rotary looper interposed between the entry end of the film guide and the film supported at that end of the guide and having convergently inclined annular flanges to grip the edges of a loop of film running from said support to the guide and means for effecting release of said pressure plate and claw to permit free entry of the leading end of the film into said guide in position for engagement by said pressure plate and claw, including a rock shaft having cam surfaces operable on the turning of said rock shaft to displace both the pressure plate and the claw away from said film guide, a solenoid for actuating said rock shaft and a switch controlled by lack of film on the support at the entry end of the guide for effecting actuation of said solenoid, and means controlled by said solenoid for effecting positive drive of said looper in one direction while the film is being withdrawn from said support and for leaving the looper free to rotate in the opposite direction when the film is being returned to said support.

6. A moving picture viewer comprising a film guide, film supply and receiving supports at opposite ends of said guide, a rotary looper adjoining the film support at one end of the guide having convergently inclined annular flanges for wedge gripping engagement with the edges of the film and motor driven means for operating said looper and rotating said film support adjacent thereto and including driven friction elements in spaced relation and a driving friction element cooperable with either of said driven friction elements to drive said looper when engaged with one driven friction element and to drive the film support when engaged with the other friction element.

7. A moving picture viewer comprising a motor, a swinging frame pivotally supported at one end, pulleys at opposite ends of said frame, a friction drive belt carried by said pulleys, drive connections from the motor to the pulley at the pivoted end of the frame, shafts in spaced relation at the swinging end of the frame, friction pulleys on said shafts in opposition to the friction drive belt, reel supporting means on one of said shafts, a film looping wheel on the other of said shafts and means controlling movements of said swinging frame to effect engagement and disengagement of said friction drive belt in respect to the friction pulleys on said reel support and film looping shafts, whereby to effect the drive of said reel support when engaged with the friction wheel on one shaft, and to effect the drive of said film looping wheel when engaged with the friction pulley of the other shaft.

8. In apparatus of the character disclosed, a film guide, a reel supporting shaft at one end of said guide, a free rotating film coiling pan at the opposite end of said guide, means for intermittently advancing film through said guide, a shaft spaced in parallel relation to the reel supporting shaft, a looper wheel carried by said parallel shaft having convergently inclined opposed flanges for gripping the edges of the film passing from the reel on the reel shaft to said film guide, motor drive mechanism and means for clutching said motor drive mechanism first to said looper shaft to effect forward feed of the film to said film guide and then to said reel supporting shaft to leave the looper free of driving operation and to drive the reel shaft to effect rewinding of the film on the reel and withdrawal of the film from the free rotating film coiling pan.

9. A moving picture viewer comprising a motor driven projector, means for controlling said motor driven projector to show a moving picture or to stop to show "stills" of selected frames, said projector having a shutter and means normally unclutched from the projector but manually engageable in clutched relation therewith and manually adjustable for effecting the turning of the shutter to permit the showing of selected frames as described, said projector having a rotary shaft for driving said shutter, said shaft having a clutch element at one end of the same and said means including a normally stationary control shaft slidingly journaled in line with but disconnected from said shutter driving shaft, said normally stationary control shaft having a companion clutch element on the end of the same engageable with said clutch element on the shutter driving shaft upon longitudinal sliding movement of said control shaft, spring means for normally holding the control shaft separated longitudinally from the shutter driving shaft and a handle on said control shaft for effecting longitudinal clutch engaging and rotary shutter shifting movements of said control shaft and a one-way clutch for driving said shaft in the picture projecting direction and for leaving said shaft free in the opposite direction and whereby said shaft may be adjusted by said means independently of other portions of the projector.

10. The moving picture viewer herein disclosed comprising a film guide, a reel carrying shaft at one end of said guide and a free rotating film receiver at the opposite end of said guide, a shaft adjoining said film supporting shaft, a looper carried by said adjoining shaft, a motor, drive connections from said motor arranged to be alternately clutched to said reel supporting and looper shafts, a solenoid having a movable core, a slide connected to said core, connections from said slide for controlling the clutching action of said motor drive connections, a switch for controlling said solenoid, a feeler for the film on the reel supporting shaft arranged to effect the actuation of said solenoid controlling switch, a brake for said free rotating film coiling receiver and operating connections from said solenoid actuated slide to said brake for applying said brake when the film is coiling in said receiver and for releasing said brake when said reel supporting shaft is being driven to rewind the film.

11. A motion picture viewer comprising a film guide, a film reel supporting spindle adjacent said guide, a friction pulley on said spindle, a film advancing fly-wheel adjoining said guide and having a shaft spaced in parallel relation with said spindle, a friction pulley on said shaft in alignment with but spaced from the pulley on the spindle and motor driven means including a friction driving element shiftable in opposite direction into driving engagement with the friction pulley on said shaft or with the friction pulley on said spindle to effect the drive of said fly-wheel at one time and drive of said reel spindle at another time.

12. A motion picture viewer comprising a horizontally disposed film guide, an upright shaft at the entry end of said film guide and a supply reel in substantially horizontal relation engaged on said shaft, a substantially horizontal fly-wheel interposed between said supply reel and the entry end of said film guide and having an upright shaft at one side of said first mentioned shaft, said fly-wheel having convergent flanges spaced and positioned to wedgingly grip the edges of a loop of film passing from the supply reel on the first mentioned shaft to the entry end of the film guide and means for selectively effecting the drive of said fly-wheel shaft in one direction to effect withdrawal of film from the supply reel or drive of the first mentioned shaft in the opposite direction to rewind film on the supply reel.

References Cited in the file of this patent

UNITED STATES PATENTS

| | | |
|---|---|---|
| 1,336,775 | Darby | Apr. 13, 1920 |
| 1,359,579 | Darby | Nov. 23, 1920 |
| 1,551,037 | Lube | Aug. 25, 1925 |
| 1,587,955 | Howell | June 8, 1926 |
| 1,920,967 | Carpenter | Aug. 8, 1933 |
| 1,943,303 | Foster | Jan. 16, 1934 |
| 1,944,035 | Proctor | Jan. 16, 1934 |
| 1,975,336 | Stechbart | Oct. 2, 1934 |
| 2,000,286 | Howell | May 7, 1935 |
| 2,049,944 | Carpenter | Aug. 4, 1936 |
| 2,051,787 | Foster | Aug. 18, 1936 |
| 2,233,389 | Kende | Feb. 25, 1941 |
| 2,369,981 | Reyniers | Feb. 20, 1945 |
| 2,391,497 | Wilson | Dec. 25, 1945 |
| 2,419,836 | Holbrook | Apr. 29, 1947 |
| 2,422,816 | Baia | June 24, 1947 |
| 2,464,220 | Duncan | Mar. 15, 1949 |
| 2,464,673 | Debrie | Mar. 15, 1949 |
| 2,477,923 | Fitt | Aug. 2, 1949 |
| 2,494,842 | Thevenaz | Jan. 17, 1950 |
| 2,511,646 | Marmour | June 13, 1950 |
| 2,533,560 | Coffey | Dec. 12, 1950 |
| 2,557,026 | Budde | June 12, 1951 |

FOREIGN PATENTS

| | | |
|---|---|---|
| 22,286 | Great Britain | Mar. 20, 1911 |
| 148,744 | Great Britain | Dec. 2, 1920 |
| 670,087 | France | Aug. 12, 1929 |
| 211,501 | Switzerland | Dec. 2, 1940 |